Jan. 23, 1945. F. H. LE JEUNE 2,367,788
LOCK RING
Filed June 26, 1943 2 Sheets-Sheet 1
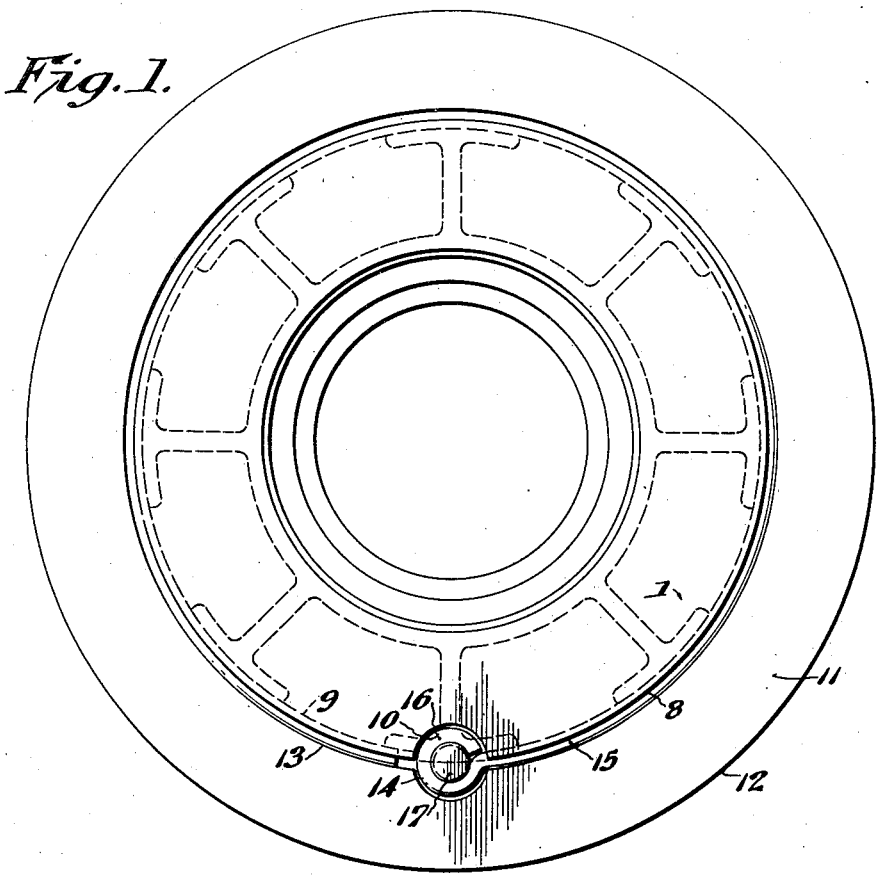
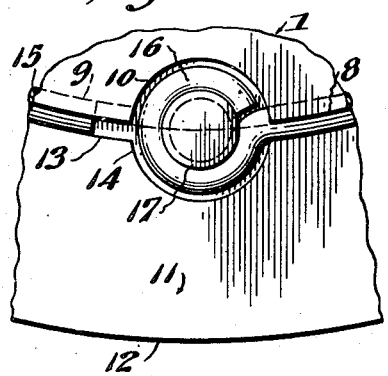
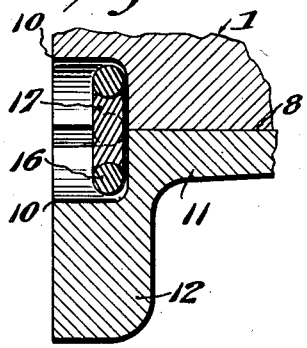
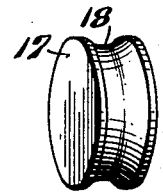
Inventor
FRANK H. LE JEUNE
By Beaman + [Attorneys]

Jan. 23, 1945.　　　F. H. LE JEUNE　　　2,367,788
LOCK RING
Filed June 26, 1943　　　2 Sheets-Sheet 2

Inventor
FRANK H. LE JEUNE
By Beaman & Langford
Attorneys

Patented Jan. 23, 1945

2,367,788

UNITED STATES PATENT OFFICE 2,367,788

LOCK RING

Frank H. Le Jeune, Jackson, Mich., assignor to Hayes Industries, Inc., Jackson, Mich., a corporation of Michigan Application June 26, 1943, Serial No. 492,440

5 Claims. (Cl. 152—410)

This invention relates to lock rings and particularly to a lock ring intended and adapted for use in connection with a detachable tire retaining flange of a wheel mounting a pneumatic or cushion tire.

An object of this invention is to provide a lock ring which is of simple and inexpensive construction, and which will serve effectively to hold a detachable tire retaining flange in tire mounting position in connection with other tire supporting portions of a wheel, and will hold the parts against relative rotational or circumferential movement.

Another object is to so construct the parts that the lock ring can be made up of wire or rod stock, by ordinary forming operations accomplished with the usual equipment, and with which the construction and arrangement of the parts is such that the rings can be completed for use with little likelihood of breakage while being formed.

Yet another purpose of this invention is to provide an annular split lock ring provided with a ring loop formation at one end and having filling means inserted within the loop to keep the loop from collapsing.

With the above and other objects in view, some of which will be apparent to those skilled in the art, and others of which are inherent in the construction and arrangement of the parts, and in the manner of use, this invention includes novel features of construction and combinations of structures which will be hereinafter set forth in connection with the drawings and then pointed out in the claims.

In the drawings:

Figure 1 is a view in side elevation of a wheel illustrating an adaptation and embodiment of this invention.

Fig. 4 is an enlarged fragmentary elevational view to better show novel features of the invention.

Fig. 5 is a fragmentary sectional view through the parts disclosed in Fig. 4.

Fig. 6 is an enlarged perspective view to better show the insert or spool for the ring loop of the lock ring.

Figure 2:
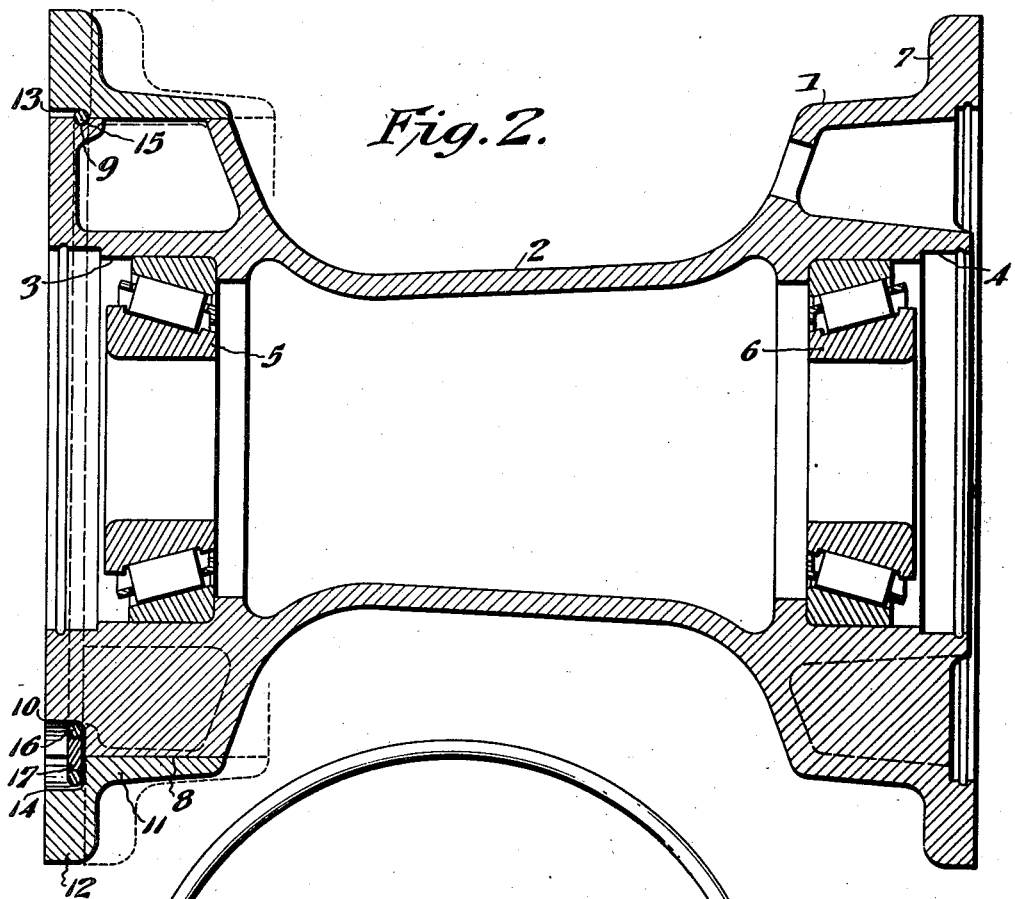
Fig. 2 is a vertical axial sectional view through the structure disclosed in Fig. 1.
Figure 3:
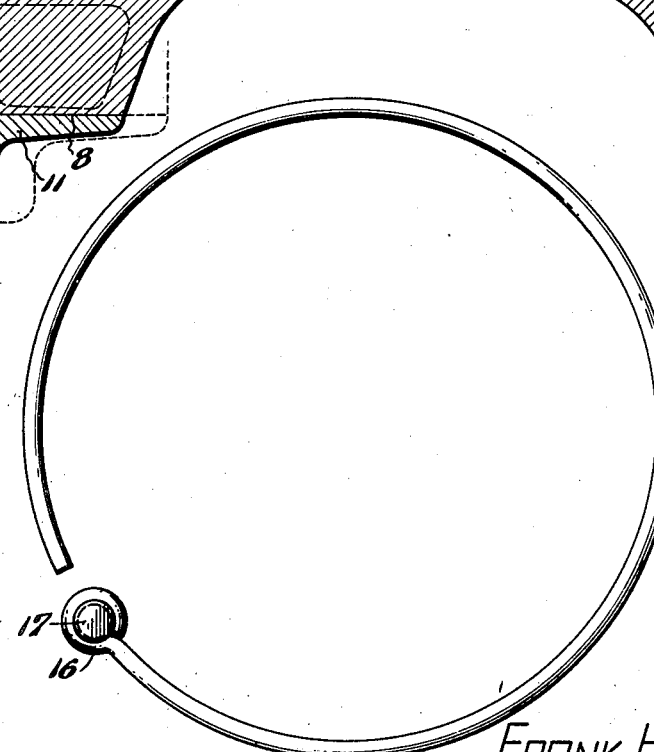
Fig. 3 is a side elevational view of the lock ring.

This invention has application primarily to a tire rim structure in which a side ring or tire retaining flange is detachably fitted in connection with other tire rim portions, and heretofore various forms of annular split lock rings have been employed to hold such tire retaining flanges in place. One expedient resorted to has been to bend the ends of the split lock ring in opposite directions, with one bent end fitted into a retaining opening in the main rim portions and the opposite end fitted in a slot in the detachable tire retaining flange. Due to the short radii, necessarily used in bending the ends of the ring to fit and enter the opening and the slot, a great deal of breakage was encountered in the manufacture and in the use of such previously employed lock rings. Therefore, it is a purpose of this invention to eliminate the driving stress on a short, sharp radius, and to provide a lock ring that can be manufactured with a minimum likelihood of damage or breakage, and which when in use will present positive driving or locking portions to maintain the detachable tire retaining flange against circumferential or peripheral movement with respect to the tire and the remaining portions of the tire mounting.

The rim may be of any desired shape or preferred type, the disclosure in the present instance being merely illustrative of an embodiment of the invention to and upon a streamline wheel adapted to mount and carry a straight-sided pneumatic tire.

The present wheel is of relatively small diameter, and the tire receiving portion 1 has a drop or channel center 2 constructed and disposed substantially as a part of the wheel bridging between the hub portions 3 and 4. The hub portions 3 and 4 are here disclosed as having anti-friction bearings 5 and 6 by which the wheel is rotatably mounted. Obviously, the portions 1 and 2 are here in substance substantially rim portions, and these parts might be corresponding tire receiving and mounting portions of any desired type of wheel.

The tire receiving portion 1 has an annular tire retaining side rim flange 7 at one side, and at the opposite side of the wheel the structure is cut away to provide a bearing portion, as at 8, which bearing portion is relatively smaller in diameter than the diameter to which the tire will fit. This mounting portion 8 is provided with a peripheral or circumstantial channel 9 spaced slightly inwardly from the corresponding outer face of the wheel, and at any suitable point has a substantially semi-circular recess 10 formed inwardly from its outer face and registering with the channel 9.

An annular rim side flange ring 11 has an internal diameter sufficient to permit said removable flange to slide freely axially over upon and off from the bearing portion 8, and this annular member 11 has a flange 12 thereon corresponding substantially to the shape of the wall of the tire, and disposed in opposed relation with respect to the side rim flange 7. The rim side flange is rabbeted or recessed at its outer side, around the opening fitting upon the bearing portion 8, as is indicated at 13, and at one point, this rim side flange 11 has a substantially semi-circular recess 14 extending inwardly from its side face to substantially register with the bottom of the rabbeted recess 13, the depth of this recess 13 being such that when the side rim flange 11 is fitted in place upon the bearing portion 8 in tire retaining relation, the rabbeted recess 13 will substantially register at its inner side with the channel 9, and when the two recesses 10 and 14 are brought together these recesses will merge into a substantially circular recess.

A split lock ring 15, made up of wire or other rod material of substantially cylindrical or other suitable cross section or shape, is of such inside diametrical dimensions that it will spring into and will of its own inherent resiliency lie within the channel 9, and this split lock ring has one end thereof looped, as indicated at 16, into a substantially ring-like eye portion, of slightly less outside diameter than the inside diameter of the substantially circular opening provided by the combined recesses 10 and 14. This loop 16 is thus readily formed by ordinary manufacturing operations, without necessity for bending the material on a sharp radius, in consequence of which the danger of breakage in the forming or manufacturing operation, and in the use of the ring, will be substantially eliminated. In making up this loop 16, an insert or filler 17 is fitted or secured within the loop, and as perhaps best shown in Fig. 5, it is perhaps preferable that this spool or insert or filler be of a thickness substantially the same as the diameter of the material of the ring 15 and consequently the loop 16. This insert or filler 17 is provided with a peripheral channel 18 which substantially conforms to the material of the ring within the loop 16, and thus this ring loop 16 is reinforced and is made to serve as a substantially solid and somewhat disk-like portion, at one end of the annular split lock ring 15, which substantially disk-like portion is receivable within the circular recess formed by the two semi-circular recesses 10 and 14.

In the use of this improved structure, and in the embodiment as illustrated, the rim side flange 11 will be removed. The tire is then fitted in place upon the tire receiving portion 1, the rim flange 7 being in engagement with one side of the tire. The rim side flange 11 is then fitted over and upon the bearing portion 8, and is pushed inwardly to substantially the position indicated by the dotted lines in Fig. 2; the rim flange being so placed that the recesses 10 and 14 are substantially opposite or in registry. The annular split lock ring 15 is then sprung over the bearing portion 8 from the outer side so that the annular part of this ring is received in the channel 9, with the ring loop 16 lying within the recess 10. The rabbeted recess at 13, in the rim side flange 11 is of sufficient diameter that when the rim side flange 11 is released this member 11 will move outwardly and will assume substantially the position shown in full lines in Fig. 2, with the inner wall of the rabbeted recess 13 engaging with the split lock ring 15 and the outer peripheral wall of this rabbeted recess 13 positively precluding expansion or enlargement of the split ring 15 to be displaced from the channel 9. The ring loop 16 then lies within the substantially circular recess formed by the two semi-circular recesses 10 and 14, and by reason of the insert or filler 17, is presented as substantially a solid or disk-like portion within the dual recess. This ring loop portion 16 will thus serve and function to positively prevent relative circumferential or peripheral movement of the rim side flange 11 on the bearing portion 8, thus avoiding the driving stress upon a sharp radius, and interposing a substantially disk-like portion.

As has been stated, the present embodiment of the invention is illustrated in connection with a streamline wheel such as might be used for mounting a tire upon an airplane, and this is only one use to which the present invention can be put. Obviously, this invention is adaptable for application to and use with substantially all types and constructions of wheel and tire mounting rim structure.

While the present disclosure is of a specific embodiment, it will be apparent to those skilled in the art that various changes and modifications can be made in the form, construction, arrangement, and assembly of the parts, and in the use and adaptation of this invention, without departing from the spirit and scope thereof, as defined by the appended claims.

I claim:

1. A wheel rim comprising a tire receiving part having a bearing portion provided with a peripheral channel, a rim side flange removably fitted on said bearing portion and provided with an internally rabbeted recess substantially registering with said channel; said part and flange being provided with substantially semi-circular recesses registering with the channel and the rabbeted recess and combining as a substantially circular recess, and a split annular lock ring removably mounted in said channel and fitting said rabbeted recess, said lock ring having an enlarged portion at one extremity received within the substantially circular recess.

2. A wheel rim comprising a tire receiving part having a bearing portion provided with a peripheral channel, a rim side flange removably fitted on said bearing portion and provided with an internally rabbeted recess substantially registering with said channel, said part and flange being provided with substantially semi-circular recesses registering with the channel and the rabbeted recess and combining as a substantially circular recess, and a split annular lock ring removably mounted in said channel and fitting said rabbeted recess, said lock ring having a ring loop at one end fitting within the registering substantially semi-circular recesses.

3. A wheel rim comprising a tire receiving part having a bearing portion provided with a peripheral channel, a rim side flange removably fitted on said bearing portion and provided with an internally rabbeted recess substantially registering with said channel, said part and flange being provided with substantially semi-circular recesses registering with the channel and the rabbeted recess and combining as a substantially circular recess, a split annular lock ring removably mounted in said channel and fitting said rabbeted recess, said lock ring having a ring loop at one end fitting within the registering substantially semi-circular recesses, and an insert filling said ring loop and preventing collapsing.

4. A wheel rim comprising a tire receiving part having a bearing portion provided with an inwardly spaced peripheral channel, a rim side flange removably fitted on said bearing portion and provided with an internally rabbeted recess substantially registering with said channel, said part and flange being provided with substantially semi-circular recesses registering with the channel and the rabbeted recess and mating as a substantially circular recess, and a split annular lock ring of a single piece of substantially cylindrical rod-like material removably mounted in said channel and having a ring loop at one extremity thereof received in the substantially circular recess.

5. A wheel rim comprising a tire receiving part having a bearing portion provided with an inwardly spaced peripheral channel, a rim side flange removably fitted on said bearing portion and provided with an internally rabbeted recess substantially registering with said channel, said part and flange being provided with substantially semi-circular recesses registering with the channel and the rabbeted recess and mating as a substantially circular recess, a split annular lock ring of a single piece of substantially cylindrical rod-like material removably mounted in said channel and having a ring loop at one extremity thereof received in the substantially circular recess, and a grooved spool-like insert within said ring loop sustaining the loop against collapsing.

FRANK H. LE JEUNE.